UNITED STATES PATENT OFFICE 2,187,823

CONDENSATION PRODUCTS OF ETHERS OF ALKYLOL AMINES

Heinrich Ulrich and Joseph Nuesslein, Ludwigshafen-on-the-Rhine, Germany, assignors to I. G. Farbenindustrie Aktiengesellschaft, Frankfort-on-the-Main, Germany No Drawing. Application March 26, 1931, Serial No. 525,591. In Germany April 1, 1930

13 Claims. (Cl. 260—404)

The present invention relates to new condensation products suitable for use as wetting, cleansing and dispersing agents, and to a process for their production.

We have found that very valuable condensation products, suitable for use as wetting, cleansing and dispersing agents as well as for general use as assistants for the purposes of the textile, leather, lacquer, lubricant, disinfectant, medicament and pest-combatting industries and the like in which water-insoluble liquid or solid substances are to be dispersed in water or aqueous solutions, can be obtained from ethers obtained from alkylol amines and corresponding to the general formula

in which $R_1$ corresponds to the formulae $$-\text{alk}-O-\text{alk}-OH$$

or

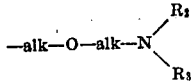

in which cases each, $R_2$ and $R_3$ indicate hydrogen or alkyl, cycloalkyl, aryl, alkylol or $$-\text{alk}-O-\text{alk}-OH$$

or both $R_2$ and $R_3$ belong to the same heterocyclic ring formed by the nitrogen atom, or in which $R_1$ with $R_2$ indicates a group of the formula $-\text{alk}-O-\text{alk}-$ in which case $R_3$ is hydrogen, or alkylol or $-\text{alk}-O-\text{alk}-OH$, alk being the same or different alkylene groups.

According to our invention these ethers are condensed with acids containing at least 8 carbon atoms, whereby either amides, or esters or salts thereof, are formed, depending on the nature of the initial materials. The acids employed may be carboxylic acids or sulphonic acids, or they may contain, in addition to one or more carboxyl groups, one or more sulphonic acid or sulphuric ester groups, i. e., groups corresponding to the formulae $-SO_3H$ and $$-O-SO_3H$$

respectively. Instead of the free acids their anhydrides, halides or esters may be employed. All these initial materials are hereinafter briefly referred to as "high-molecular organic acid substances".

The ethers, which are used as initial materials according to our present invention, can be readily obtained for example from alkylol amines by splitting off water or by etherification with olefine oxides or with the halogen hydrins of polyvalent alcohols.

In order to effect the desired condensation, elevated temperatures are required as a rule. When the nitrogen atom of the ether employed is directly connected to a hydrogen atom, this will usually enter into reaction first, amides being thus formed. Hydroxyl groups in most cases react with the acids with greater difficulty, so that in this case somewhat higher temperatures are as a rule required. Generally speaking, for the condensation of the ethers with the free acids or their esters the temperature will range between 150° and 180° C., whereas when employing the acids in the form of their halides the temperatures will vary between 60° and 100° C. Higher or lower temperatures than indicated may, however, also be employed in some cases; thus an acid chloride reacts with an ether which is free from hydroxyl groups, in some cases at temperatures as low as about 10° C.

For the employment of the condensation products as wetting, cleansing and dispersing agents it does not make any difference whether the products are amides or esters or salts thereof. No sharp differentiation between these different types need therefore be made, especially in view of the fact that a condensation product may be an amide and simultaneously an ester.

Those properties of the condensation products which render them suitable for use as wetting, cleansing and dispersing agents, may be still further enhanced by esterification with strong polybasic mineral acids, i. e., with sulphuric or phosphoric acid, if free hydroxyl groups are present in the product, or sulphonic acid groups may be introduced into the molecule, as for example by treatment with chlorosulphonic acid of a condensation product containing the radicle of an unsaturated acid such as oleic acid, or those condensation products which contain a free hydroxyl group or a hydrogen atom connected to a nitrogen atom may also be alkylated or hydroxyalkylated, for example with the aid of alkyl halides or alkylene oxides. Several of these methods may also be applied to the condensation products. The esterification with sulphuric acid or the sulphonation may be carried out in the presence of inert diluents, such as carbon tetrachloride, or of compounds which are sulphonated such as aromatic hydrocarbons as for example naphthalene or its homologues, in which latter case mixtures of sulphonation products may be obtained.

The condensation products according to the present invention may also be obtained by first converting hydroxyalkylamines into esters or amides containing free hydroxyl groups, these groups being then etherified with the aid of an alkylene oxide.

In many cases the utility of the new condensation products for wetting, cleansing and dispersing purposes is increased by the addition of soaps or substances of soap-like character, glue, gelatin or other substances having gelatinizing power, sulphite cellulose waste liquor, organic solvents or water-soluble salts or several of these substances.

For example, with the aid of the said condensation products organic solvents may be dissolved, or solvents, fats, oils or waxes may be emulsified, in water whereby products are obtained which are eminently suitable for example for the treatment of textiles such as washing, bleaching and dyeing, even in acid baths. For the preparation of emulsions for example, the oils to be emulsified may be treated with aqueous solutions or suspensions of the said condensation products; frequently however, as for example in the preparation of solid lubricants, it is advantageous to dissolve the said condensation products in the oils, waxes or fats and only then to add water to these solutions.

The following examples will further illustrate the nature of this invention, but the invention is not restricted to these examples. The parts are by weight.

Example 1

284 parts of stearic acid are heated for several hours with 149 parts of triethanolamine trihydroxyethyl ether (obtainable by acting with 3 molecular proportions of ethylene oxide on an aqueous solution of tri-ethanol amine) at from 160° to 180° C. A yellow condensation product soluble in acids is obtained. The product may be sulphonated by gradually introducing 100 parts of the stearic ester at from 40° to 50° C. into 300 parts of concentrated sulphuric acid, if desired in the presence of 40 parts of naphthalene in which case the temperature is raised for 2 hours to from 70° to 80° C. after the whole quantity of ester has been introduced. The condensation may also be carried out with the employment of a vacuum say at 20 millimeters mercury gauge at a correspondingly lower temperature of say from 140° to 150° C.

If instead of adding Glauber's salt to a dye-bath containing an acid-dyeing dyestuff, from 1 to 2 per cent (by weight with reference to the goods to be dyed) of the said condensation product, whether sulphonated or not, is added, a good and thorough dyeing is obtained even with badly levelling dyestuffs, and dyeings having a good uniformity and fastness to rubbing are obtained.

If 1 gram of the said condensation product or its sulphonation product is added per liter to a carbonizing bath of 2.5° Beaumé strength containing sulphuric acid, an almost immediate wetting of the goods to be carbonized is effected. In spite of the small amount of acid the carbonization is uniform and quite satisfactory.

If, for dyeing woolen goods, 2 per cent (by weight with reference to the wool to be dyed) of the said condensation product, whether sulphonated or not, is added to an indigo vat which has been rendered weakly acid by the addition of ammonium bisulphate, dyeings of excellent fastness to rubbing and scraping are obtained in addition to a good exhaustion of the vat even when large amounts of acid are added.

Example 2

100 parts of olive oil are slowly heated to 180° C. with 48 parts of tetrahydroxyethyl ethylene diamine mono-hydroxyethyl ether, obtainable by the treatment of 1 molecular proportion of ethylene diamine with 5 molecular proportions of ethylene oxide and corresponding to the formula

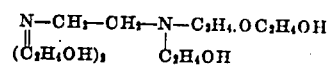

until an acidified sample of the reaction mixture is soluble in water. About 100 parts of a neutral soap are then added to the product.

About 5 per cent of the resulting product is added to a fulling bath. If dyed woolen piece goods are treated with this fulling bath, which may even have an acid reaction, a good fulling effect, a good protection of the fibres and a good preservation of the dyeing is obtained even in cases in which the dyeing is not otherwise stable to the usual fulling. If it is desired to remove insoluble impurities, as for example pitch spots, mineral oil stains and the like, organic solvents are added to the said mixture, which solvents are insoluble in water but are solubilized by stirring with the said condensation product alone or in combination with soaps.

Example 3

The ester obtainable by condensing 1 molecular proportion of stearic acid and 1 molecular proportion of diethanolamine by heating to about 170° C. is condensed under the same conditions with propylene oxide to form the dipropanol ether of the ester. 100 parts of this compound are then dissolved in 100 parts of ethyl ether and incorporated at 30° C. with a solution of 40 parts of chlorsulphonic acid in 40 parts of ethyl ether, the product then being poured onto 100 parts of ice, rendered neutral and freed from ether. The sodium salt obtained of the acid sulphuric ester of the etherified ester has an excellent washing action. On the other hand the ether of the ester may be converted into a phosphoric ester by dissolving 5 parts thereof in 10 parts of carbon tetrachloride and warming the solution together with 1 part of phosphorus pentoxide for some hours to about 90° C., the remainders of carbon tetrachloride then being evaporated. The phosphoric ester may be employed instead of the sulphuric ester.

Example 4

2 molecular proportions of stearic acid are condensed with 1 molecular proportion of tri-n-butanol amine mono-hydroxyethyl ether to form the ester. The resulting product is converted with an equimolecular proportion of para-toluene-sulphonic-chloride into the corresponding para-toluene sulphonic ester. (The tri-n-butanol amine mono-hydroxyethyl ether can be prepared by introducing a current of gaseous ethylene oxide into an equimolecular proportion of an aqueous solution (of 70 per cent strength) of tri-(β-hydroxy-n-butyl) amine

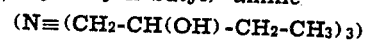

at a temperature of from about 20° to 30° C.; the water is then distilled off and the remaining ether is purified by fractional distillation).

A similar product is obtained by employing, instead of the tri-n-butanol amine mono-hydroxyethyl ether, the mono-hydroxyethyl ether of di-isobutanol-mono-ethanol amine which corresponds to the formula

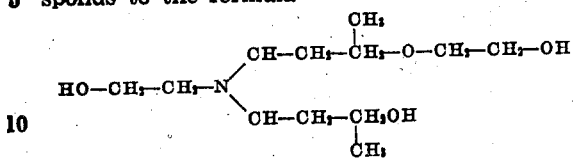

and may be obtained by introducing 2 molecular proportions of ethylene oxide at between 20° and 30° C. in a 70 per cent aqueous solution of 1 molecular proportion of di-isobutanol amine, distilling off the water and rectifying the product in vacuo.

*Example 5*

Monoethanolamine may also be condensed with p-toluene-sulphonic-chloride by gradually introducing 1 molecular proportion of mono-ethanol amine into 1 molecular proportion of para-toluene sulphonic chloride, the reaction proceeding with the evolution of heat. After adding 1 molecular proportion of caustic soda in the form of a solution thereof in ethyl alcohol the alcohol is evaporated and the sulphonic amide is converted into its hydroxyethyl ether by acting thereon at 100° C. in a closed vessel with 1 molecular proportion of ethylene oxide. The ether is then esterified by heating it with 1 molecular proportion of stearic acid at 170° C. The product corresponds to the formula

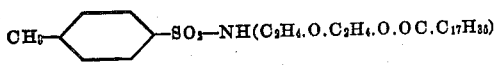

*Example 6*

Di-ethanolamine is heated with about twice its weight of sulphuric acid of 70 per cent strength at a temperature of 170° C. during 4 hours. The reaction mixture is then allowed to cool and poured into a mixture of ice and water. The sulphuric acid is precipitated by the addition of lime, the calcium sulphate is filtered off, the resulting aqueous solution of morpholine is neutralized by means of hydrochloric acid and is then evaporated in vacuo. Free morpholine is prepared therefrom by the addition of a solution of caustic soda. 55 parts of sodium carbonate are added to a solution of 87 parts of morpholine in 100 parts of water, and 300 parts of oleic chloride are then allowed to flow into the mixture. The whole is then gently heated to about 95° C. for about one hour. The product separates out and is dried in vacuo. The dry wax-like mass is melted and then poured into 100 parts of concentrated sulphuric acid and kept at a temperature of 20° to 30° C. until it becomes soluble in water and the sulphuric ester of morpholine oleic amide is formed. If chlorosulphonic acid is used instead of sulphuric acid, a true sulphonic acid is obtained. The phosphoric ester of the morpholine oleic amide may be prepared in a similar way by mixing the morpholine oleic amide with twice its weight of phosphorus acid at room temperature.

*Example 7*

Equimolecular proportions of hydroxyethylmorpholine and oleic acid are condensed with each other by heating for about 4 hours to 180° C. The resulting product has a good washing action in acid baths.

*Example 8*

1 molecular proportion of the mono-hydroxyethyl ether of mono-(β-ethylhexyl)-di-(hydroxyethyl)-amine (corresponding to the formula

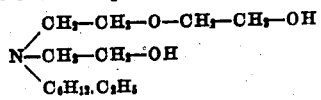

and obtainable by acting with 3 molecular proportions of ethylene oxide on 1 molecular proportion of β-ethylhexyl-amine) is condensed with 1 molecular proportion of stearic acid by heating for several hours to 170° C. When carrying out the operation in vacuo, for example at a pressure of about 20 millimeters mercury, the temperature may be lowered to about 150° C. and the reaction proceeds more rapidly.

*Example 9*

173 parts of the hydroxyethyl ether of N-hydroxyethylpiperidine (obtainable by acting with 2 molecular proportions of ethylene oxide on 1 molecular proportion of piperidine) are heated with 200 parts of lauric acid for 2 hours to about 160° C., and then further heated for an hour at the said temperature under a reduced pressure of 20 millimeters of mercury.

An analogous product is obtained by employing, instead of the piperidine derivative, 225 parts of the monohydroxyethyl ether of di-hydroxyethyl aniline.

*Example 10*

104 parts of β,β'-diamino-diethyl ether are dissolved in 200 parts of water. While cooling to 10° C. 300 parts of oleic chloride are then introduced, and the mass is then heated for a short time to 50° C. The resulting product corresponds to the formula $C_{17}H_{33}.CO—NH—CH_2.CH_2—O—CH_2.CH_2—NH_2.HCl$

What we claim is:

1. Condensation products of an ether corresponding to the general formula

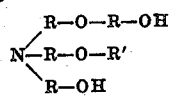

in which R is an alkylene radicle and R' represents a radical of the group consisting of hydrogen and —R—OH, with stearic acid.

2. Condensation products of an ether corresponding to the general formula

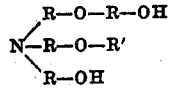

in which R is ethylene and R' represents a radical of the group consisting of hydrogen and —R—OH, with stearic acid.

3. Condensation products of an ether corresponding to the general formula

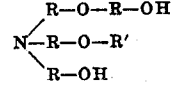

in which R is an alkylene radicle and R' represents a radical of the group consisting of hydrogen and —R—OH, with oleic acid.

4. Condensation products of an ether corresponding to the general formula

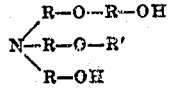

in which R is ethylene and R' represents a radical of the group consisting of hydrogen and —R—OH, with oleic acid.

5. A condensation product of an ether corresponding to the general formula:

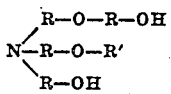

in which R is an alkylene radicle and R' represents a radical of the group consisting of hydrogen and —R—OH, with a high molecular organic acid, selected from the class consisting of fatty acids containing at least 8 carbon atoms and monocyclic aromatic sulphonic acids.

6. A condensation product of an ether corresponding to the general formula:

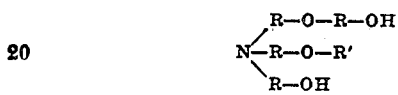

in which R is an alkylene radicle and R' represents a radical of the group consisting of hydrogen and —R—OH, with a fatty acid containing at least 8 carbon atoms.

7. A condensation product of an ether corresponding to the general formula

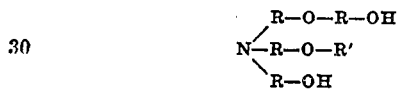

in which R is an alkylene radicle and R' represents a radical of the group consisting of hydrogen and —R—OH, with a monocyclic aromatic sulphonic acid.

8. An ester having the general formula

in which X is an aliphatic ether radical, R represents a member of the group consisting of hydrogen, aliphatic ether radicals, and alkylol radicals, and R' is a higher fatty acid radical.

9. The process of producing condensation products, which comprises condensing a nitrogenous ether selected from the group of compounds represented by the formulae

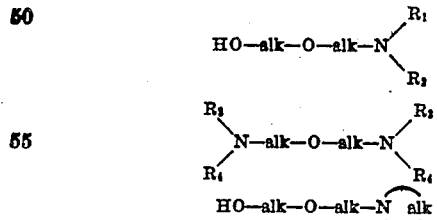

and

wherein alk represents an alkylene group, $R_1$, $R_2$, $R_3$ and $R_4$ each represent a member selected from the group consisting of hydrogen, alkyl, monocyclic cycloalkyl, aryl, alkylol and -alk-O-alk-OH radicles, at least one of said groups $R_3$ and $R_4$ being a member selected from the group consisting of hydrogen, alkylol and -alk-O-alk-OH radicals and $R_5$ represents a member selected from the group consisting of hydrogen, alkylol and -alk-O-alk-OH with a high-molecular organic acid substance, selected from the group consisting of fatty acids containing at least 8 carbon atoms, halides and esters of said acids, and monocyclic aromatic sulphonic acids, and esters and halides of said acids.

10. The process of producing condensation products, which comprises condensing a nitrogenous ether selected from the group of compounds represented by the formulae

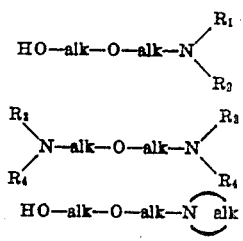

and

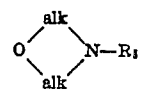

wherein alk represents an alkylene group, $R_1$, $R_2$, $R_3$ and $R_4$ each represent a member selected from the group consisting of hydrogen, alkyl, monocyclic cycloalkyl, aryl, alkylol and -alk-O-alk-OH radicals, at least one of said groups $R_3$ and $R_4$ being a member selected from the group consisting of hydrogen, alkylol and -alk-O-alk-OH radicals and $R_5$ represents a member selected from the group consisting of hydrogen, alkylol and -alk-O-alk-OH with a high-molecular organic acid substance, selected from the group consisting of fatty acids containing at least 8 carbon atoms, halides and esters of said acids, and monocyclic aromatic sulphonic acids, and esters and halides of said acids, while heating to between 60° and 180° C., the exact temperature varying with the particular acid substance used, being in the upper end of the range when free acids or esters are used and being in the lower end of the range when acid halides are used.

11. The process of producing condensation products, which comprises condensing a nitrogenous ether selected from the group of compounds represented by the formulae

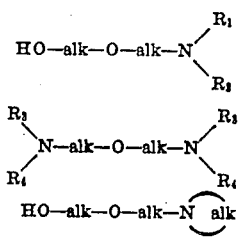

and

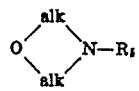

wherein alk represents an alkylene group, $R_1$, $R_2$, $R_3$ and $R_4$ each represent a member selected from the group consisting of hydrogen, alkyl, monocyclic cycloalkyl, aryl, alkylol and -alk-O-alk-OH radicals, at least one of said groups $R_3$ and $R_4$ being a member selected from the group consisting of hydrogen, alkylol and -alk-O-alk-OH radicals and $R_5$ represents a member selected from the group consisting of hydrogen, alkylol and -alk-O-alk-OH with a high molecular organic acid substance, selected from the group consisting of fatty acids containing at least 8 carbon atoms, halides and esters of said acids, and monocyclic aromatic sulphonic acids, and esters and halides of said acids to give a product containing at least one hydroxyl group and esterifying the product with a strong polybasic mineral acid.

12. Condensation products selected from the group of compounds represented by the formulae

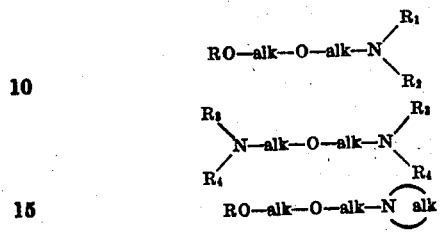

and

wherein R represents the acid radical of a high molecular organic acid substance, selected from the group consisting of fatty acids containing at least 8 carbon atoms and monocyclic aromatic sulphonic acids, $R_1$, $R_2$, $R_3$ and $R_4$ each represent a member selected from the group consisting of hydrogen, alkyl, monocyclic cycloalkyl, aryl, alkylol, -alk-O-alk-OH, -R, -alk-OR and -alk-O-alk-OR, at least one of said groups $R_3$ and $R_4$ being a member selected from the group consisting of R, -alk-OR and -alk-O-alk-OR and $R_5$ represents a member selected from the group consisting of R, -alk-OR and -alk-O-alk-OR, R in every case being defined as above.

13. Condensation products selected from the group of compounds represented by the formulae

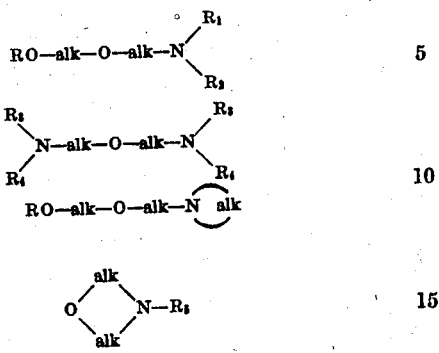

and wherein R represents the acid radical of a high molecular organic acid substance, selected from the group consisting of fatty acids containing at least 8 carbon atoms and monocyclic aromatic sulphonic acids, $R_1$, $R_2$, $R_3$ and $R_4$ each represent a member selected from the group consisting of hydrogen, alkyl, monocyclic cycloalkyl, aryl, alkylol, -alk-O-alk-OH, -R, -alk-OR and -alk-O-alk-OR, at least one of said groups $R_3$ and $R_4$ being a member selected from the group consisting of R, -alk-OR and -alk-O-alk-OR and $R_5$ represents a member selected from the group consisting of R, -alk-OR and -alk-O-alk-OR, R in every case being defined as above, in which condensation products any free hydroxyl groups present are esterified with a strong polybasic mineral acid.

HEINRICH ULRICH.
JOSEPH NUESSLEIN.